July 7, 1942.  H. P. CHANDLER  2,288,681
OVERHEAD TROLLEY WIRE DEVICE
Filed Oct. 25, 1941
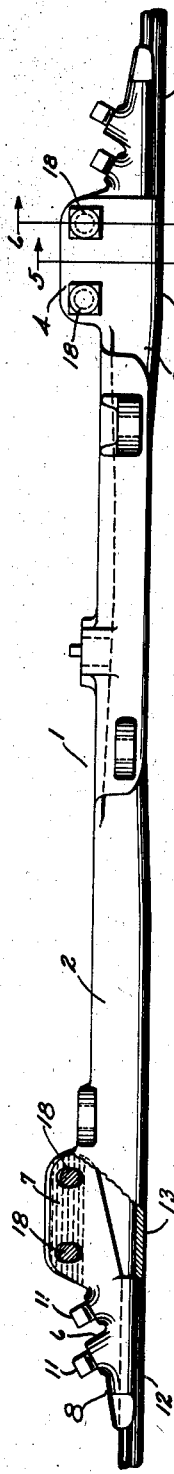
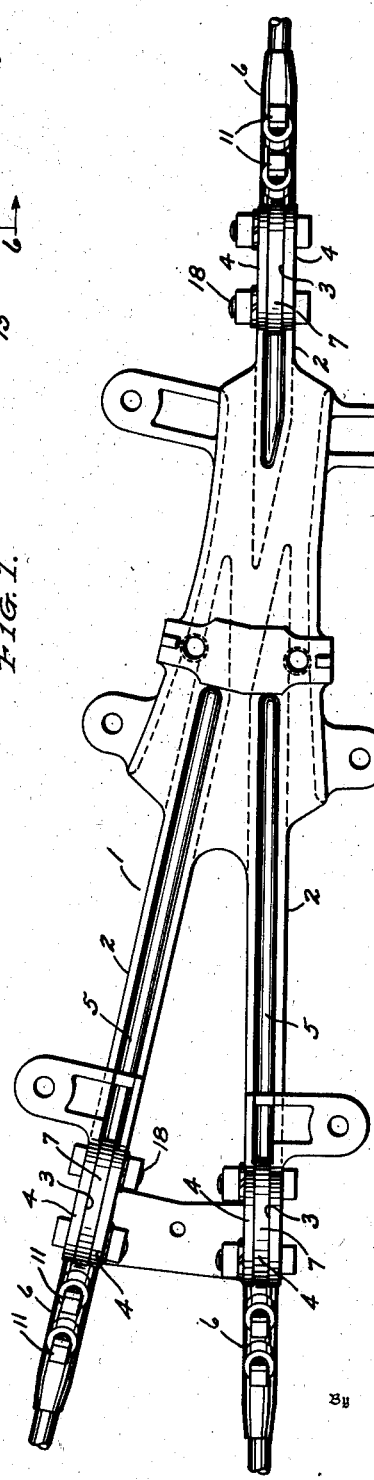
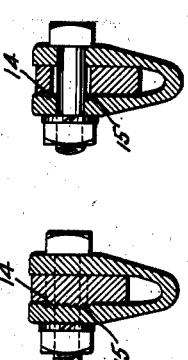
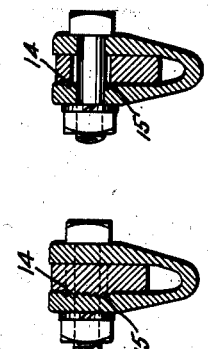
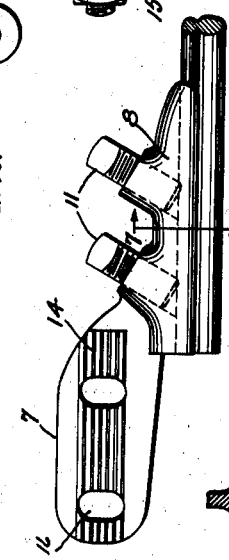
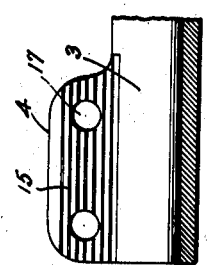
HOMER P. CHANDLER DEC'D.
Inventor
By Lillian C. Chandler
Administratrix
Attorney Patented July 7, 1942

2,288,681

UNITED STATES PATENT OFFICE 2,288,681

OVERHEAD TROLLEY WIRE DEVICE

Homer P. Chandler, deceased, late of Mansfield, Ohio, by Lillian C. Chandler, administratrix, Mansfield, Ohio, assignor to The Ohio Brass Company, Mansfield, Ohio Application October 25, 1941, Serial No. 416,565

15 Claims. (Cl. 191—37)

This invention relates to overhead trolley systems and has particular reference to those devices or fittings used in the construction of overhead trolley systems such as frogs, section insulators, splicers, etc., and more specifically this invention relates to the means for attaching the trolley wire to such devices.

One object of this invention is to provide a trolley wire holder or tip to receive trolley wires of different sizes and to hold the wire in fixed relation to a trolley wire fitting, such as a frog, section insulator, etc., and, also, provide means cooperating with means on the fitting which will permit adjusting the holder relative to the fitting so that the running or contact surface of the trolley wire may be brought into alignment with the running surface on the fitting.

Another object of this invention is to provide means on a trolley wire holder or tip to cooperate with means on a trolley wire fitting to maintain a fixed relation between the fitting and the holder after the adjustment of the trolley wire relative to the fitting.

Another object of this invention is to provide means on the trolley wire tip or holder to cooperate with means on the fitting to maintain the longitudinal alignment of the tip relative to the fitting.

Other objects will be apparent to those skilled in the art and a better understanding of this invention will be had from the following description given in connection with the drawing illustrating one embodiment of this invention.

In the drawing—

Fig. 1 is a side view of one embodiment of this invention in partial section and with reference to a trolley frog.

Fig. 2 is a top view of the invention shown in Fig. 1.

Fig. 3 is an enlarged view in section of the end of the frog arm shown in Fig. 1.

Fig. 4 is an enlarged side view of a trolley wire holder or tip with a trolley wire in position.

Fig. 5 is a sectional view on line 5—5 of Fig. 1.

Fig. 6 is a sectional view on line 6—6 of Fig. 1.

Fig. 7 is a section taken on the line 7—7 of Fig. 4 and shows the application of the tip to two different sizes and styles of trolley wire.

In the past it has been customary to form the tips or wire holding member of trolley wire devices so as to be applied to its fitting in a definite manner and therefore adapted to take a single size and style of wire. This means that an operator must carry a supply of tips of each size and style of wire.

It is the purpose of this invention to provide a tip or holder which will take several different sizes of trolley wire and be applied to a fitting to give a smooth underrun for its current collector in each case.

Tips of the past have been arranged to be applied to the fittings in a definite manner with the lower edge of the trolley wire on the same plane with the lower edge of the fitting. This gives a smooth path for the current collector but will mean an uneven path if the tip is used with other sizes or styles of wire than that for which it was intended. Such uneven path is very disastrous and must be avoided if possible.

A tip designed to take two or more sizes and styles of trolley wire will apply to the same in the manner shown in Fig. 7 which shows two sizes and styles of wire. It is possible with this invention to provide a device which will use trolley wires ranging in capacity from 4/0 to 400000 cm.

In Fig. 1 is shown an embodiment of this invention relating to a trolley frog in which 1 represents the frog which may be of any of the well known designs on the market for directing the course of travel of a current collector at a junction point of trolley wires.

The ends of the arms 2 are shown as formed with the channel 3 between two upright walls 4. The channel 3 at the ends of the arms may extend back and form the channel 5 which is a continuation of the channel 4 and in which channel 5 the trolley wire rests if it is continuous. The wire, however, will merely butt the end of the arm 2 when a tip or holder 6, as shown in Fig. 1, is used.

It is important that the tip or holder 6 shall have a secure and rigid attachment to the ends of the arms 2 to withstand the longitudinal strain which tends to cause the tips to buckle or bend relative to the arms 2.

The tip or holder usually comprises a tongue portion 7 and a wire holding portion 8, the latter provided with a longitudinal groove 9 with lips 10 to enter the grooves in the trolley wire. One or more diagonally placed set screws 11 are employed to engage and prevent the wire from slipping from the tip in a longitudinal direction.

It has been the practice to secure the tip to the arm 2 by means of a pair of through bolts arranged to fit registering holes in the tongue 7. This permits of no adjustment of the tip relative to its arm 2 but any slack between the bolts and holes is very likely to be taken up under strain and permit the tip to buckle relative to the arm, thus destroying the so-called "straight underrun" for the current collector.

This invention provides means for permitting adjustment of the tip 6 relative to the arm 2 in a transverse or vertical direction whereby the trolley wire running surface 12 is brought into alignment with the corresponding surface 13 on the arm 2.

This invention, also, provides means for increasing the resistance to buckling of the tip relative to its arm.

To carry out this invention in one form, the tongue 7, on one face at least, is provided with a serrated formation 14 consisting of a number of longitudinally and alternately disposed intersections and projections upon the side face of the tongue and which extend from the free end of the tongue to the inner end thereof or substantially so (see Figs. 4 and 5). To further complete this invention, the inner surface of one of the walls 4 is provided with a corresponding serrated formation 15 arranged to cooperate with the serrated formation 14 upon the surface of the tongue 7. The groove portion of the said formation 15 is depressed whereby the said formation is even with the face of the wall, since the formation 14 of the tongue is raised upon the surface of the tongue. This permits the opposed faces of the walls and tongue to engage.

The serrated formation on the wall at the end of the arm 2 extends from the free end of the arm for a length at least equal to that of the formation on the tongue whereby it is possible to assemble the tip within the slot 3 by registering the serrations at the free end of the arm and tip and then moving the tip longitudinally relative to the arm until the tip is properly positioned in the slot or groove 3.

If it is found that the lower face of the trolley wire when installed in the groove of the tip does not align with the lower face of the arm, then the tip is redrawn and repositioned relative to the arm and reassembled as before. Should the tip be provided with a running surface for the current collector, the tip should be adjusted to bring such surface into alignment with the running surface of the arm 2.

The projections of the serrated formation on one member interengage with the depressions of the serrated formation of the other member.

In order to permit the transverse or vertical adjustment of the members as just described, one member is provided with slots or apertures 16 and the other member with circular holes 17 to fit the bolts 18. These through openings register and the slotted openings permit relative transverse or vertical adjustment of the tip and arm but do not permit relative longitudinal movement (see Fig. 1).

When the bolts 18 are drawn up bringing the walls 4 into secure engagement with the tongue and especially the two serrated formations into cooperation, they materially assist the bolts in resisting buckling of the members.

The invention herein disclosed is shown as applied to a trolley frog, but it is also applicable to section insulators or section insulator switches, or splicing ears, or to sector bars, curve segments, crossings, etc., all well known devices used in the construction of overhead trolley systems and the application thereto being the same as described in connection with a frog.

It will be evident that the raised serrated formation 14 may be applied upon the inner surface of the wall 4 and the depressed serrated formation 15 applied to the face of the tongue 7, this being merely a reversal of the formations as shown.

It will, also, be evident that the formations may be applied to both surfaces of the tongue and to the inner surface of both walls 4.

It will, also, be evident that the tip 6 may have a clevis end in place of the tongue 7 and the fitting to which it is attached formed with a tongue as shown in Figs. 7 and 8 of Matthes Patent 2,229,333.

The operation of the diagonally positioned set screws 11 is clearly disclosed in Chandler Patent 1,912,177.

Other formations and means may be substituted for, and which will function the same as, the serrated formation shown and described.

Having thus described this invention and illustrated its use, what is claimed as new and desired to secure by Letters Patent is:

1. An overhead trolley wire device comprising a frong to receive a main wire and a branch wire and having means for directing a current collector along the main wire or onto the branch wire, the said means having contact surfaces for said current collector, separately formed means at each end of the frogs to receive and hold the trolley wires in predetermined relation to the frog, means on the separately formed means arranged to be received by means on the said frog, the separately formed means being vertically adjustable relative to the said frog whereby the contact surface of a selected trolley wire of one of a plurality of sizes of wire may have its contact surface brought into alignment with the contact surface on the frog, means on the separately formed means cooperating with means on the frog whereby the separately formed means is held in its adjusted position and transversely disposed means to hold the parts in assembled relation with the said cooperating means on one part in cooperating engagement with the cooperating means on the other part.

2. An overhead trolley wire device comprising a member to guide a current collector, separately formed means at each end of the member to receive and hold the trolley wire in predetermined relation to the member, the trolley wire and the member each provided with a contact or running surface for the current collector, means at each end of the member to receive projecting means on the separately formed means, the separately formed means vertically adjustable relative to the member whereby the contact surface of a selected trolley wire may be brought into alignment with the contact surface on the member, and means associated with the separately formed means cooperating with means associated with the member to hold the separately formed means and the member in adjusted relation with said contact surfaces in alignment.

3. An overhead trolley wire device comprising a member to guide a current collector, separately formed means associated with each end of the member to receive and hold the trolley wire in predetermined relation to the member, the trolley wire and the member each provided with a contact or running surface for the current collector, the separately formed means being vertically adjustable relative to the member whereby the contact surface of a pre-selected trolley wire may be brought into alignment with the contact surface on the member, and means associated with the separately formed means cooperating with means associated with the member to hold the separately formed means and the member in adjusted relation with said contact surfaces in alignment.

4. An overhead trolley wire device comprising a member to guide a current collector, separately formed means associated with the member, the member having a contact surface for the current collector and the separately formed means provided with means to receive and hold the trolley wire, the said separately formed means being vertically adjustable relative to the member whereby the contact surface on the member may be brought into alignment with that of any preselected trolley wire of a number of sizes of trolley wire and registering transverse openings through the said member and separately formed means to receive holding means to draw the separately formed means and the member into close cooperation and to maintain said cooperation after the contact surfaces have been brought into alignment, one or more of said openings being so formed that said movement of the parts may be attained whereby said alignment may be effected.

5. An overhead trolley wire device comprising a member to guide a current collector, separately formed means associated with the member, the member having a contact surface for the current collector and the separately formed means provided with means to receive and hold the trolley wire, the said separately formed means being vertically adjustable relative to the member whereby the contact surface on the member may be brought into alignment with that of a selected trolley wire, registering transverse openings through the said member and separately formed means to receive holding means to draw the separately formed means and the member into close cooperation and to maintain said cooperation after the contact surfaces have been brought into alignment, one or more of said openings being so formed that said movement of the parts may be attained whereby said alignment may be effected and longitudinally disposed means on the separately formed means cooperating with longitudinally formed means on the member to prevent said relative movement of the parts after said adjustment has been made.

6. An overhead trolley device comprising a plurality of parts, namely, a member to guide a current collector and separately formed means at each end of the member to receive and hold a trolley wire provided with a contact surface, the said member having a contact surface for the current collector, the said parts having interfitting tongues and clevises so constructed and related that the separately formed means may be vertically adjusted relative to the member to bring the said contact surface of any one trolley wire into alignment with the contact surface of said member, longitudinally disposed means on the tongue cooperating with longitudinally disposed means on the member to prevent said relative movement of the parts after adjustment and means to hold said cooperating means in their adjusted position.

7. An overhead trolley device comprising a plurality of main parts, namely, a member to guide a current collector and separately formed means associated with the member and adapted to receive and hold a trolley wire, the member having a contact surface for the current collector, the said parts having interfitting tongues and clevises and opposed surfaces and so constructed and related relative to each other that vertical adjustment may be effected of the separately formed means relative to the member to bring the said contact surfaces into alignment with any one running surface of the trolley wire, a serrated formation mounted upon a surface of the said tongue and a corresponding serrated formation depressed in the opposed surface of the clevis, the said formations cooperating to prevent relative movement of the parts after alignment of the contact surfaces and means to hold the formations in cooperative relation.

8. An overhead trolley device comprising a plurality of main parts, namely, a member to guide a current collector and separately formed means associated with the member and adapted to receive and hold a trolley wire, the member having a contact surface for the current collector, the said parts having interfitting tongues and clevises and opposed surfaces and so constructed and related relative to each other that vertical adjustment may be effected of the separately formed means relative to the member to bring the said contact surfaces into alignment with the running surface of any one selected trolley wire, at least one surface on each tongue and the opposed surface on the member provided with serrated formations having interlocking projections and intersections whereby movement of the separately formed parts relative to the member after alignment of the contact surfaces is prevented and means to hold the intersections and projections in cooperative relation.

9. An overhead trolley wire device comprising a member to guide a current collector, separately formed tips associated with the member to receive and hold trolley wires, the tips being adjustable relative to the member whereby trolley wires of different size and shape may be used with the same device and the contact surface of the wire brought into alignment with the contact surface on the fitting, means on the tips cooperating with means on the member whereby the said adjustment is maintained and means to maintain said cooperation.

10. An article of manufacture comprising a fitting, a member adapted to be attached to the fitting in longitudinal alignment therewith and movable relative to the fitting in a direction transverse to the axis of the fitting whereby the member may be vertically adjusted relative to the fitting, means on the fitting registering with means on the member to receive means to hold said adjustment and draw the parts into holding engagement and auxiliary means on the fitting cooperating with auxiliary means on the member whereby the parts are held against movement after adjustment has been effected, the said auxiliary means being so constructed and arranged relative to each other that they may be brought into cooperative relation by a relative movement in a longitudinal direction when placed end to end.

11. An overhead trolley wire device comprising a member having a contact surface to guide a current collector, separately formed tips attached to the member and having means to receive and hold a trolley wire, the tips being so related to the member that they may be positioned relative to the member in a direction transverse to the longitudinal axis of the device whereby the contact surface on the member may be brought into alignment with the contact surface of a selected trolley wire, means on the tip cooperating with means on the member to guide the movement of the tip into position relative to the member in a longitudinal direction when placed end to end whereby the alignment of the trolley wire and the member is maintained during said movement and means extending through registering openings in the tip and member to hold the cooperating means in engagement when the tip and member are finally adjusted.

12. An overhead trolley system comprising a severed trolley wire having spaced ends and a contact surface along which a current collector moves, a device bridging the space between said ends and comprising a main member having a guiding surface for the current collector and end members associated with the main member and provided with means to receive and hold the trolley wire ends, means on the end members cooperating with means on the main member so that the tip may be positioned and held in different vertical positions relative to the longitudinal axis of the main member whereby the contact surface of a selected trolley wire may be aligned with that on the main member and other means arranged to hold the last said cooperating means on the end members and on the main member in cooperative relation.

13. An overhead trolley wire device comprising a member to guide a current collector and having a contact surface engaged by the current collector, separately formed tips attached to the member and having means to receive and hold a trolley wire, the tips being so constructed and arranged relative to the member that they may be positioned at different vertical distances from said contact surface so that the contact surface of a selected trolley wire may be aligned with that of the member, means on the tips cooperating with means on the member whereby the said alignment may be prevented from shifting and other means cooperating with the member and tips to hold the cooperating means in cooperative relation.

14. A tip or end fitting for a trolley wire device comprising, a holding portion to receive and hold a trolley wire, a tongue portion projecting from the holding position, means associated with at least one face of the tongue portion and adapted to cooperate with means on a cooperating member of the said device to prevent vertical displacement of the tip relative to the said cooperating member after the position of the tip relative to the cooperating member has been established and one or more vertically disposed elongated apertures through the tongue portion adapted to receive transversely disposed means, the length of the aperture being such that the vertical adjustment of the tip relative to the cooperating member may be effected for the purpose described.

15. A tip or end fitting for a trolley wire device comprising, a hold portion to receive a trolley wire, means to engage the trolley wire to prevent longitudinal movement thereof under stress, a tongue portion projecting longitudinally from an end of the holding portion, means associated with at least one face of the tongue portion adapted to cooperate with similar means on a cooperating member of the said device to prevent vertical displacement of the tip relative to the said cooperating member after the position of the tip relative to the cooperating member has been established for the purpose described, the last said means comprising longitudinally disposed intersections and projections, and one or more vertically disposed elongated apertures through the tongue portion adapted to receive transversely disposed holding means, the length and width of each aperture being such that the said vertical positioning of the tip relative to the cooperating member may be effected for the purpose described but the longitudinal movement of the tip relative to the cooperating member will be prevented.

LILLIAN C. CHANDLER,
*Administratrix of the Estate of Homer P. Chandler, Deceased.*